(12) United States Patent
Koskinen et al.

(10) Patent No.: US 11,963,104 B2
(45) Date of Patent: Apr. 16, 2024

(54) MECHANISM FOR INTERACTIONS FOR ENTERING INTO SLEEP MODE

(71) Applicant: Nokia Technologies Oy, Espoo (FI)

(72) Inventors: Jussi-Pekka Koskinen, Oulu (FI); Chunli Wu, Beijing (CN); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 363 days.

(21) Appl. No.: 17/423,570

(22) PCT Filed: Jul. 12, 2019

(86) PCT No.: PCT/CN2019/095870
§ 371 (c)(1),
(2) Date: Jul. 16, 2021

(87) PCT Pub. No.: WO2021/007725
PCT Pub. Date: Jan. 21, 2021

(65) Prior Publication Data
US 2022/0116878 A1    Apr. 14, 2022

(51) Int. Cl.
*H04W 76/28*    (2018.01)
*H04W 52/02*    (2009.01)

(52) U.S. Cl.
CPC ....... *H04W 52/0235* (2013.01); *H04W 76/28* (2018.02)

(58) Field of Classification Search
CPC ......... H04W 52/0216; H04W 52/0229; H04W 52/0232; H04W 52/0235; H04W 76/27;
(Continued)

(56) References Cited

U.S. PATENT DOCUMENTS

| 7,499,434 B2* | 3/2009 | Cheng | H04W 76/20 370/335 |
| 2014/0112221 A1* | 4/2014 | Verger | H04W 52/0216 370/311 |

(Continued)

FOREIGN PATENT DOCUMENTS

| CN | 109309555 A | 2/2019 |
| CN | 109804662 A | 5/2019 |

(Continued)

OTHER PUBLICATIONS

Partial European Search Report received for corresponding European Patent Application No. 19931497.2, dated May 21, 2021, 11 pages.

(Continued)

*Primary Examiner* — Jean A Gelin
(74) *Attorney, Agent, or Firm* — Harrington & Smith

(57) ABSTRACT

Embodiments of the present disclosure relate to mechanism for interactions for entering into the sleep mode. According to embodiments of the present disclosure, the network device transmits the information of go-to-sleep, GTS, to the terminal device on a lower layer (for example, the physical layer). The lower protocol layer informs the higher protocol layer (for example, the MAC layer) of the information of GTS. The terminal device determines how to monitor the physical downlink channel based on the information of GTS. Further, the terminal device may switch bandwidth part based on the information of GTS. In this way, the GTS is able to significantly save power.

19 Claims, 7 Drawing Sheets

(58) Field of Classification Search
CPC ..... H04W 76/28; H04W 80/02; H04W 72/04; H04W 72/044
USPC .......................................................... 370/311
See application file for complete search history.

(56) References Cited

U.S. PATENT DOCUMENTS

| | | | |
|---|---|---|---|
| 2015/0085907 A1* | 3/2015 | Cooper | H04M 11/066 375/222 |
| 2016/0142188 A1* | 5/2016 | Suzuki | H04W 24/10 370/329 |
| 2020/0077338 A1* | 3/2020 | Sui | H04W 52/0229 |
| 2020/0119895 A1* | 4/2020 | Choi | H04L 5/0092 |
| 2020/0137741 A1* | 4/2020 | Zhou | H04L 5/0053 |
| 2020/0314811 A1* | 10/2020 | Lin | H04L 5/0094 |
| 2020/0337110 A1* | 10/2020 | Kim | H04W 76/28 |
| 2022/0124622 A1* | 4/2022 | Islam | H04W 72/542 |
| 2022/0191793 A1* | 6/2022 | Murray | H04W 72/23 |

FOREIGN PATENT DOCUMENTS

| | | |
|---|---|---|
| CN | 109842937 A | 6/2019 |
| EP | 3661094 A1 | 6/2020 |
| WO | 2019/134643 A1 | 7/2019 |

OTHER PUBLICATIONS

"UE Power saving schemes with power saving signal/channel/procedures", 3GPP TSG RAN WG1 Meeting #95, R1-1812642, Agenda: 7.2.9.2.2, CATT, Nov. 12-16, 2018, 10 pages.

Extended European Search Report received for corresponding European Patent Application No. 19931497.2, dated Oct. 11, 2021, 13 pages.

"PDCCH-based power saving signal/channel", 3GPP TSG RAN WG1 #97, R1-1906170, Agenda: 7.2.9.1, vivo, May 13-17, 2019, 10 pages.

"3rd Generation Partnership Project; Technical Specification Group Radio Access Network; NR; NR and NG-RAN Overall Description; Stage 2 (Release 15)", 3GPP TS 38.300 V15.5.0, Mar. 2019, pp. 1-97.

"3rd Generation Partnership Project; Technical Specification Group Radio Access Network; NR; Medium Access Control (MAC) protocol specification (Release 15)", 3GPP TS 38.321 V15.5.0, Mar. 2019, pp. 1-78.

"3rd Generation Partnership Project; Technical Specification Group Radio Access Network; NR; Radio Resource Control (RRC) protocol specification (Release 15)", 3GPP TS 38.331 V15.5.1, Apr. 2019, pp. 1-491.

International Search Report and Written Opinion received for corresponding Patent Cooperation Treaty Application No. PCT/CN2019/095870, dated Apr. 13, 2020, 9 pages.

Office action received for corresponding Chinese Patent Application No. 201980049485.4, dated Jun. 26, 2023, 8 pages of office action and no page of translation available.

Office action received for corresponding European Patent Application No. 19931497.2, dated Aug. 24, 2023, 4 pages.

"Maintenance for NR random access", 3GPP TSG RAN WG1 Meeting #94bis, R1-1811381, Agenda: 7.1.1.2, NTT DOCOMO, Inc., Oct. 8-12, 2018, 5 pages.

* cited by examiner

MECHANISM FOR INTERACTIONS FOR ENTERING INTO SLEEP MODE

RELATED APPLICATION

This application was originally filed as PCT Application No. PCT/CN2019/095870, filed on Jul. 12, 2019, each of which is incorporated herein by reference in its entirety.

FIELD

Embodiments of the present disclosure generally relate to the field of communications and in particular, to a method, device, apparatus and computer readable storage medium for interaction for entering into the sleep mode.

BACKGROUND

Recently, several technologies for power saving have been proposed. For example, Discontinuous Reception (DRX) can be used for saving power consumption at terminal devices. In addition, one of the proposed mechanisms is physical layer based go-to-sleep (GTS) command where the terminal device is commanded to sleep with DCI. However, the mechanism for achieving the GTS has not been determined. Thus, further discussion concerning the GTS is needed.

SUMMARY

Generally, embodiments of the present disclosure relate to a method for interactions for entering into the sleep mode and the corresponding communication devices.

In a first aspect, there is provided a first device. The device comprises at least one processor; and at least one memory including computer program codes; the at least one memory and the computer program codes are configured to, with the at least one processor, cause the first device to receive first signaling information on a first protocol layer, the first signaling information concerning monitoring a physical downlink channel. The first device is also caused to receive, from the second device and on a second protocol layer lower than the first protocol layer, second signaling information indicating the first device to enter into a sleep mode. The first device is further caused to monitor the physical downlink channel based on the first signaling information and the second signaling information.

In a second aspect, there is provided a second device. The device comprises at least one processor; and at least one memory including computer program codes; the at least one memory and the computer program codes are configured to, with the at least one processor, cause the second device to transmit, to a first device and on a first protocol layer, first signaling information concerning monitoring a physical downlink channel. The second device is also caused to generate, at the second device, second signaling information indicating the first device to enter into a sleep mode. The second device is further caused to transmit, to the first device, the second signaling information on a second protocol layer lower than the first protocol layer.

In a third aspect, there is provided a method. The method comprises receiving, at a first device and on a first protocol layer, first signaling information concerning monitoring a physical downlink channel. The method also comprises receiving, from the second device and on a second protocol layer lower than the first protocol layer, the second signaling information indicating the first device to enter into a sleep mode. The method further comprises monitoring the physical downlink channel based on the first signaling information and the second signaling information.

In a fourth aspect, there is provided a method. The method comprises transmitting, to a first device and on a first protocol layer, first signaling information concerning monitoring a physical downlink channel. The method also comprises generating, at the second device, second signaling information indicating the first device to enter into a sleep mode. The method further comprises transmitting, to the first device, the second signaling information on a second protocol layer lower than the first protocol layer.

In a fifth aspect, there is provided an apparatus. The apparatus comprises means for receiving, at a first device, first signaling information on a first protocol layer, the first signaling information concerning monitoring a physical downlink channel. The apparatus further comprises means for receiving, from the second device and on a second protocol layer lower than the first protocol layer, second signaling information indicating the first device to enter into a sleep mode. The apparatus also comprises means for monitoring the physical downlink channel based on the first signaling information and the second signaling information.

In a sixth aspect, there is provided an apparatus. The apparatus comprises means for transmitting, to a first device and on a first protocol layer, first signaling information concerning monitoring a physical downlink channel. The apparatus also comprises means for generating, at the second device, second signaling information indicating the first device to enter into a sleep mode. The apparatus further comprises means for transmitting, to the first device, the second signaling information on a second protocol layer lower than the first protocol layer.

In a seventh aspect, there is provided a non-transitory computer readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
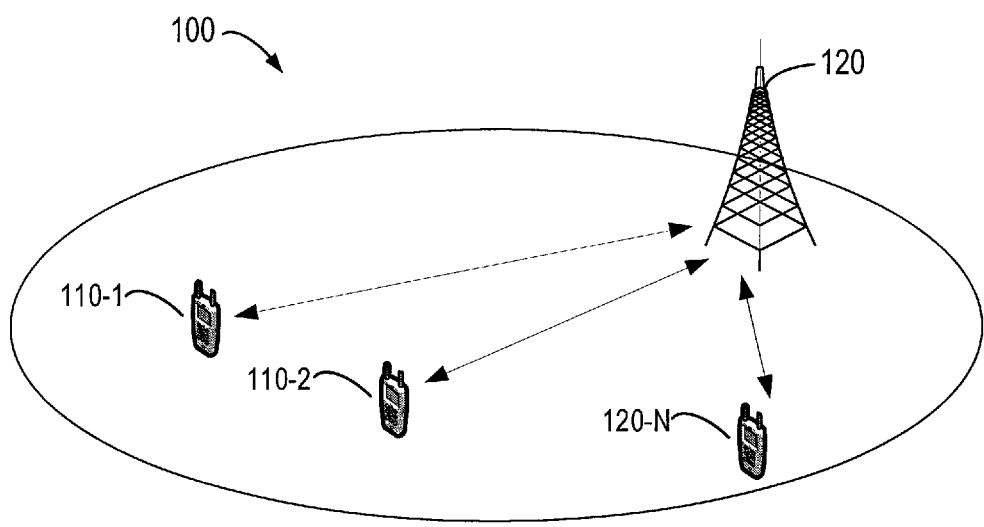
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the DRX and the GTS can be used for saving power. The DRX can be configured via a Radio Resource Control (RRC) signaling. The GTS is physical layer-based. Thus, how the GTS works with the DRX needs to be specified if GTS is to be supported. For instance, the network may have many terminal devices to schedule at the same time in distinct beams that cannot be done simultaneously. Hence, it may need to let some terminal devices sleep for a while as it cannot schedule until X time and uses GTS.

According to embodiments of the present disclosure, the network device transmits the information of GTS to the terminal device on a lower layer (for example, the physical layer). The terminal device configured with the DRX receives the information of GTS on the lower layer and informs the higher layer (for example, the MAC layer) of the information of GTS. The terminal device determines how to perform the DRX based on the information of GTS and the configuration of the DRX. Further, the terminal device may switch bandwidth part (BWP) based on the information of GTS. In this way, the GTS and the DRX can work together so as to significantly save power.

FIG. 1 illustrates a schematic diagram of a communication system 100 in which embodiments of the present disclosure can be implemented. The communication system 100 comprises the first devices 110 and the second device 120. For the purpose of illustrations, the first devices 110 may be referred to as the terminal device 110 and the second device 120 may be referred to as the network device 120 hereinafter. It should be noted that the first devices and the second devices are interchangeable. For example, the procedures which are described to be implemented at the terminal device may also be able to be implemented at the network device and the procedures which are described to be implemented at the network device may also be able to be implemented at the terminal device.

The link from the second device 120 to the first devices 110 may be referred to as the "down link" and the link from the first devices 110 to the second device 120 may be referred to as the "uplink link."

The communication system 100, which is a part of a communication network, comprises terminal devices 110-1, 110-2, . . . , 110-N (collectively referred to as "terminal device(s) 110" where N is an integer number). The communication system 100 comprises one or more network devices, for example, a network device 120. It should be understood that the communication system 100 may also comprise other elements which are omitted for the purpose of clarity. It is to be understood that the numbers of terminal devices and network devices shown in FIG. 1 are given for the purpose of illustration without suggesting any limitations. The terminal devices 110 and the network device 120 may communicate with each other.

It is to be understood that the number of network devices and terminal devices is only for the purpose of illustration without suggesting any limitations. The system 100 may include any suitable number of network devices and terminal devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
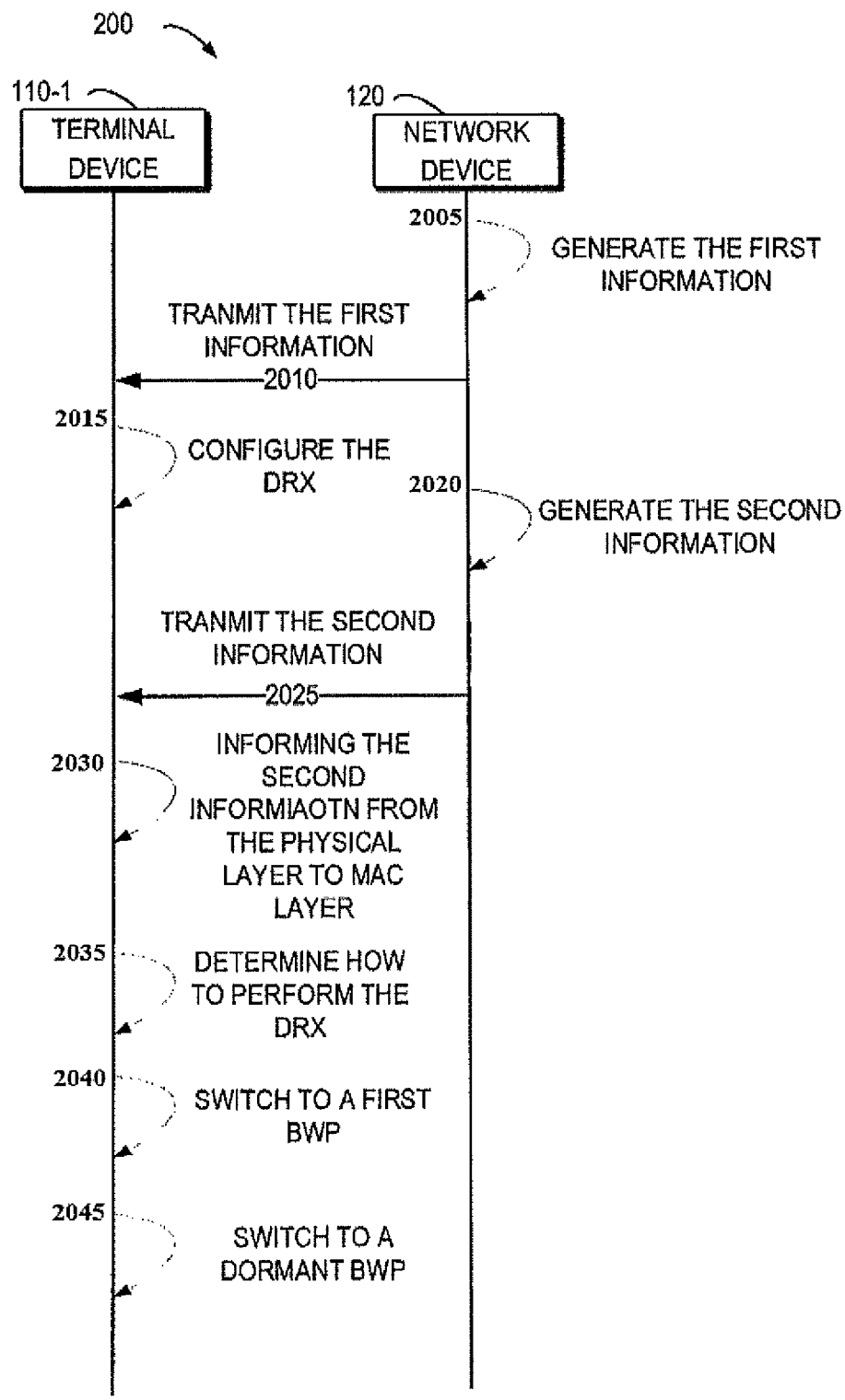
FIG. 2 illustrates a schematic diagram of interactions among devices according to embodiments of the present disclosure.

FIG. 2 illustrates a schematic diagram of interactions 200 in accordance with embodiments of the present disclosure. The interactions 200 may be implemented at any suitable devices. Only for the purpose of illustrations, the interactions 200 are described to be implemented at the terminal device 110-1 and the network device 120.

Figure 3:
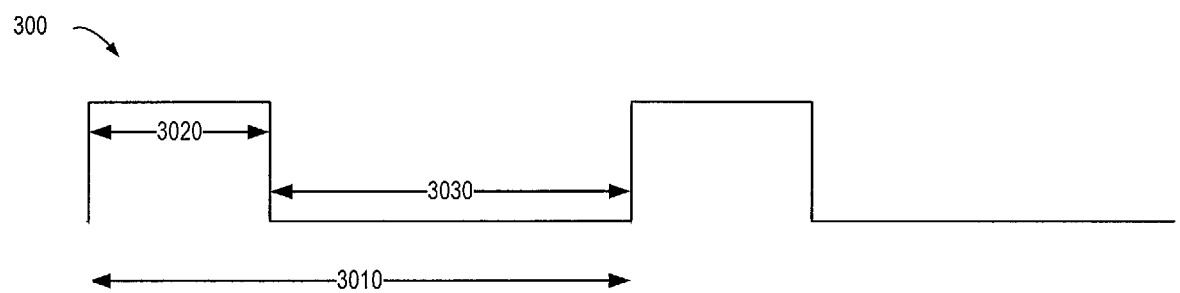
FIG. 3 illustrates a schematic diagram of a configuration of the DRX.

The network device 120 may generate 2005 the first signaling information concerning monitoring the physical downlink channel. In some embodiments, the first signaling information may comprise timer configuration of the DRX. FIG. 3 illustrates the schematic diagram of the configuration of the DRX. The configuration comprises one or more cycle 3010 of the DRX. The cycle 3010 may comprise an on-duration 3020 where the terminal device 110-1 waits to receive PDCCHs after waking up. If the terminal device 110-1 successfully decodes a PDCCH, the terminal device 110-1 stays awake and starts an inactivity timer. The cycle 3010 may also comprise an inactive duration 3030 where the terminal device 110-1 does not need to monitor the PDCCH. The cycle may comprise short DRX cycle and/or long DRX cycle.

The configuration of the DRX may comprise an inactivity-timer where the terminal device 110-1 waits to successfully decode a PDCCH, from the last successful decoding of a PDCCH. If the terminal device 110-1 fails to decode the PDCCH addressed to itself, it can go back to sleep after the timer expiry. The terminal device 110-1 shall restart the inactivity timer following a single successful decoding of a PDCCH for a first transmission only (i.e. not for retransmissions). The configuration of the DRX may also comprise retransmission-timer which is the duration until a retransmission can be expected.

The configuration of the DRX may comprise active time which is total duration in which the terminal device 110-1 monitors PDCCH. The active time may comprise the "on-duration" 3020 of the DRX cycle 3010, the time when the terminal device 110-1 is performing continuous reception while the inactivity timer has not expired, and the time when the terminal device 110-1 is performing continuous reception while waiting for a retransmission opportunity. The configuration may comprise the configuration of a short DRX and/or the configuration of a long DRX. It should be noted that the first signaling information may comprise any kind of suitable information for monitoring the physical downlink channel and the DRX configuration is only an example. In some embodiments, the first signaling information comprises configuration of a first bandwidth part and a second bandwidth part on a serving cell with respective downlink control channel monitoring configurations. The respective downlink control channel monitoring configurations may be the same. The respective downlink control channel monitoring configurations The network device 120 transmits 2005 the first signaling information concerning monitoring the physical downlink channel to the terminal device 110-1 on a first protocol layer. The first protocol layer may be a higher layer, for example, the MAC layer. The terminal device 110-1 may in the RRC CONNECTED sate. The first signaling information may be transmitted via a Radio Resource Control (RRC) signaling. If the DRX is configured, the terminal device 110-1 does not need to continuously monitor physical downlink control channel (PDCCH). The physical downlink channel may be the PDDCCH channel. Alternatively, the physical downlink channel may be a physical downlink shared channel (PDSCH).

The terminal device 110-1 may configure 2015 the DRX. For example, the terminal device 110-1 may perform the long/short DRX based on the first signaling information. The network device 120 generates 2020 the second signaling information. The second signaling information indicates the terminal device 110-1 to enter a sleep mode. Alternatively, the second signaling information may also comprise the time period during which the terminal device 110-1 is allowed to sleep.

The network device 120 generates 2020 the second signaling information to indicate the terminal device 110-1 to enter the sleep mode. The second signaling information may be the GTS command. In some embodiments, the second signaling information may comprise an indication to indicate the terminal device to stop an active timer of the DRX to enter into the sleep mode. Alternatively, the second signaling information may comprise an indication to perform the DRX based on the configuration in the first signaling information. In other embodiments, the second signaling information may comprise an indication to perform the long DRX. The second signaling information may comprise explicit information to indicate the terminal device 110-1 how to perform the DRX upon receiving the second signaling information. Alternatively, the second signaling information may only indicate to enter the sleep mode.

In some embodiments, the second signaling information may also indicate to switch the terminal device 110-1 to the first BWP for the primary cell connected with the terminal device 110-1. In some embodiments, the second signaling information may also indicate to switch the terminal device 110-1 to the dormant BWP for the secondary cell connected with the terminal device 110-1. In other embodiments, the second signaling information may also comprise an indication to stop decoding a physical downlink shared channel (PDSCH) during the sleep mode.

The network device 120 transmits 2025 the second signaling information to the terminal device 110-1 on the second protocol layer. The second protocol layer may be lower than the first protocol layer. For example, the second protocol layer may be the physical layer and the first protocol layer may be the MAC layer. In some embodiments, the second signaling information may be transmitted in the downlink control information (DCI). For example, the DCI may comprise an indication of go-to-sleep where the terminal device is indicated to transition from Active Time to outside Active Time or the terminal device is indicated to stay outside Active Time. The DCI may also comprise an indication of wakeup where the terminal device is indicated to transition from outside Active Time to Active Time or the terminal device is indicated to stay at Active time.

The lower layer of the terminal device 110-1 may inform 2030 the higher layer of the terminal device 110-1 that the second signaling information is received from the network device 120. In this way, the lower layer and the higher layer are in synchronization about the second signaling information.

The terminal device 110-1 determines 2035 how to perform the DRX. In some embodiments, how to perform the DRX may be predetermined. For example, if the terminal device 110-1 receives the second signaling information, the terminal device 110-1 may perform the DRX based on the configuration according to predetermined information. In some embodiments, if the terminal device 110-1 receives the second signaling information, the terminal device 110-1 may perform long DRX according to the predetermined information. In some embodiments, the terminal device 110-1 may perform the same DRX as previously configured/used. In some embodiments, the terminal device 110-1 may perform the long DRX once the second signaling information is received. Alternatively, the terminal device 110-1 may perform the short DRX once the second signaling information is received.

In some embodiments, the second signaling information may indicate how to perform the DRX. For example, the second signaling information may indicate the terminal device 110-1 to perform the same actions as when the DRX command MAC CE is received. Alternatively, the second signaling information may indicate the terminal device 110-1 to perform the same actions as when the long DRX command MAC CE is received. Alternatively or in addition, if the terminal device 110-1 receives the second signaling information, the terminal device 110-1 may stop the DRX timers.

The terminal device may switch the BWP based on the second signaling information. In an example embodiment, the terminal device may switch 2040 to the first BWP based on the second signaling information. For example, the second signaling information may indicate the terminal device 110-1 to switch to a default/initial/firstActive BWP for the primary cell (PCell) and/or primarily secondary cell (PSCell) and the terminal device 110-1 may perform the same actions as the long DRX command MAC CE is received. If the BWP is not switched, the terminal device 110-1 may perform actions as the DRX command MAC CE is received. In this way, the power consumption at the terminal device may be further saved. In some embodiments, even if the terminal device 110-1 does not configure with the DRX, the terminal device 110-1 may also switch the BWP based on the second signaling information.

In an example embodiment, the terminal device may switch 2045 to the dormant BWP for the secondary cell (SCells). In some embodiments, the second signaling information may also indicate the terminal device 110-1 to switch to the initial/default/dormant/firstActive BWP for secondary cells (SCells). Alternatively, the terminal device may switch to the dormant BWP for SCells based on MAC CE as well. The terminal device 110-1 does not monitor PDCCH for the SCell when it is on the dormant BWP for the SCell. In some embodiments, the second signaling information may indicate that the terminal device not to decode the PDSCH during the sleep/DRX period. If the terminal device 110-1 is switched the dormant BWP for the SCell, there is no PDCCH monitoring for the dormant BWP.

Figure 4:
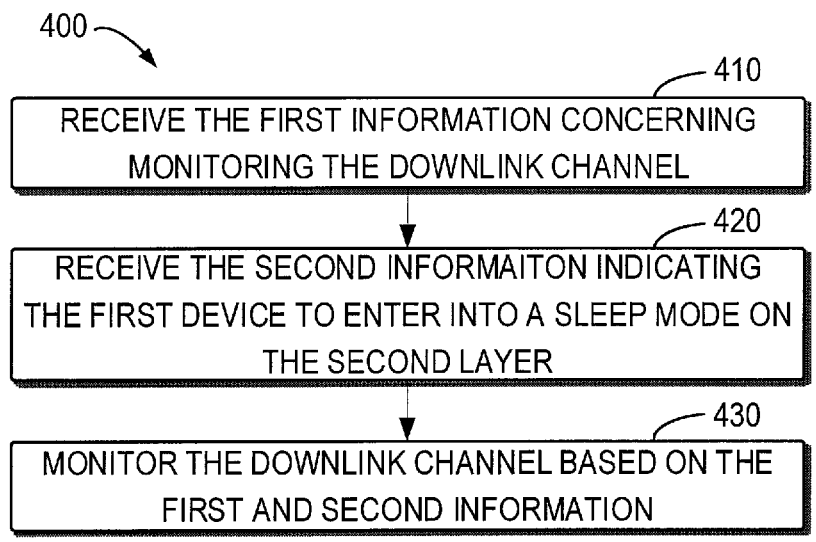
FIG. 4 illustrates a flow chart of a method implemented at a terminal device according to embodiments of the present disclosure.

FIG. 4 illustrates a flow chart of a method 400 in accordance with embodiments of the present disclosure. The method 400 may be implemented at any suitable devices. Only for the purpose of illustrations, the method 400 is described to be implemented at the terminal device 110-1. It should be noted that the method 400 may also be implemented at the network device 120.

At block 410, the terminal device 110-1 receives the first signaling information on the first protocol layer. The first signaling information is about monitoring the physical downlink channel. In some embodiments, the first signaling information comprises the timer configuration of the DRX. The first protocol layer may be a higher layer, for example, the MAC layer. The terminal device 110-1 may in the RRC CONNECTED sate. The first signaling information may be transmitted via a Radio Resource Control (RRC) signaling. If the DRX is configured, the terminal device 110-1 does not need to continuously monitor physical downlink control channel (PDCCH). The first signaling information may comprise the configuration for short DRX. In some embodiments, the first signaling information may also comprise the configuration for long DRX.

In some embodiments, the terminal device 110-1 may configure the DRX. For example, the terminal device 110-1 may perform the long/short DRX based on the first signaling information. The network device 120 generates the second signaling information. The second signaling information indicates the terminal device 110-1 to enter a sleep mode. Alternatively, the second signaling information may also comprise the time period during which the terminal device 110-1 is allowed to sleep.

At block 420, the terminal device 110-1 receives the second signaling information indicating the terminal device 110-1 to enter into the sleep mode. The second signaling information is received on the second protocol layer which is lower than the first protocol layer. For example, the second protocol layer may be the physical layer and the first protocol layer may be the MAC layer. In some embodiments, the second signaling information may be received in the downlink control information (DCI).

The lower layer of the terminal device 110-1 may inform the higher layer of the terminal device 110-1 that the second signaling information is received from the network device 120. In this way, the lower layer and the higher layer are in synchronization about the second signaling information.

At block 430, the terminal device 110-1 monitors the physical downlink channel based on the second signaling information and the timer configuration. For example, if the terminal device 110-1 receives the second signaling information and the first signaling information comprises the DRX configuration, the terminal device 110-1 may perform the DRX based on the configuration according to predetermined information. In some embodiments, if the terminal device 110-1 receives the second signaling information, the terminal device 110-1 may perform long DRX according to the predetermined information. In some embodiments, the terminal device 110-1 may perform the same DRX as previously configured. In some embodiments, the terminal device 110-1 may perform the long DRX once the second signaling information is received. Alternatively, the terminal device 110-1 may perform the short DRX once the second signaling information is received.

In some embodiments, the second signaling information may indicate how to perform the DRX. For example, the second signaling information may indicate the terminal device 110-1 to perform the same actions as when the DRX command MAC CE is received. Alternatively, the second signaling information may indicate the terminal device 110-1 to perform the same actions as when the long DRX command MAC CE is received. Alternatively or in addition, if the terminal device 110-1 receives the second signaling information, the terminal device 110-1 may stop the DRX timers.

In an example embodiment, the terminal device may switch the BWP based on the second signaling information. In an example embodiment, the terminal device may switch to the first BWP based on the second signaling information. If the cell is a primary cell, the first BWP is one of the followings for the primary cell: an initial BWP, a default BWP and a first Active BWP. Alternatively or in addition, if the cell is a secondary cell, the first BWP is one of the followings for the secondary cell: an initial BWP, a default BWP, a first Active BWP and a dormant BWP.

For example, the second signaling information may indicate the terminal device 110-1 to switch to a default/initial/firstActive BWP for the PCell and/or primarily secondary cell PScell connected with the terminal device 110-1 and the terminal device 110-1 may perform the same actions as the long DRX command MAC CE is received. If the BWP is not switched, the terminal device 110-1 may perform actions as the DRX command MAC CE is received. In this way, the power consumption at the terminal device may be further saved.

In an example embodiment, the terminal device may switch to the dormant BWP for SCells. In some embodiments, the second signaling information may also indicate the terminal device 110-1 to switch to the dormant BWP for SCells. Alternatively, the terminal device may switch to the dormant BWP for SCells based on MAC CE as well. In some embodiments, the second signaling information may indicate that the terminal device not to decode the PDSCH during the sleep/DRX period.

Figure 5:
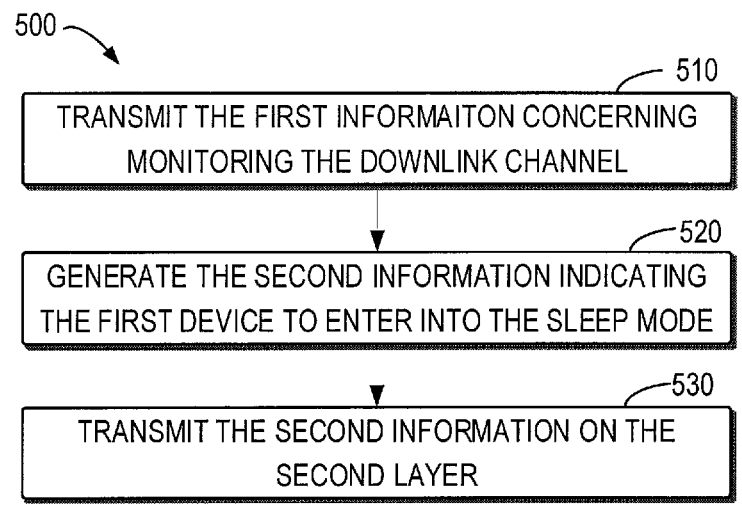
FIG. 5 illustrates a flow chart of a method implemented at a network device according to embodiments of the present disclosure.

FIG. 5 illustrates a flow chart of a 500 in accordance with embodiments of the present disclosure. The method 400 may be implemented at any suitable devices. Only for the purpose of illustrations, the method 500 is described to be implemented at the network device 120. It should be noted that the method 500 may also be implemented at the terminal device 110-1.

In some embodiments, the network device 120 may generate the first signaling information concerning the physical downlink channel. In some embodiments, the first signaling information comprises timer configuration of the DRX. The configuration comprises a cycle of the DRX. The cycle may comprise an on-duration where the terminal device 110-1 waits to receive PDCCHs after waking up. If the terminal device 110-1 successfully decodes a PDCCH, the terminal device 110-1 stays awake and starts an inactivity timer. The cycle may also comprise an inactive duration 3030 where the terminal device 110-1 does not need to monitor the PDCCH.

The configuration of the DRX may comprise an inactivity-timer where the terminal device 110-1 waits to successfully decode a PDCCH, from the last successful decoding of a PDCCH. If the terminal device 110-1 fails to decode the PDCCH, it can go back to sleep. The terminal device 110-1 shall restart the inactivity timer following a single successful decoding of a PDCCH for a first transmission only (i.e. not for retransmissions). The configuration of the DRX may also comprise retransmission-timer which is the duration until a retransmission can be expected.

The configuration of the DRX may comprise active time which is total duration in which the terminal device 110-1 monitors PDCCH. The active time may comprise the "on-duration" 3020 of the DRX cycle 3010, the time when the terminal device 110-1 is performing continuous reception while the inactivity timer has not expired, and the time when the terminal device 110-1 is performing continuous reception while waiting for a retransmission opportunity. The configuration may comprise the configuration of a short DRX and/or the configuration of a long DRX. It should be noted that the firs signaling information may comprise any suitable information for monitoring the physical downlink channel and the DRX configuration is only an example.

At block 510, the network device 120 transmits the first signaling information concerning the DRX to the terminal device 110-1 on a first protocol layer. The first protocol layer may be a higher layer, for example, the MAC layer. The terminal device 110-1 may in the RRC CONNECTED sate. The first signaling information may be transmitted via a Radio Resource Control (RRC) signaling. If the DRX is configured, the terminal device 110-1 does not need to continuously monitor physical downlink control channel (PDCCH).

At block 520, the network device 120 generates the second signaling information to indicate the terminal device 110-1 to enter the sleep mode. In some embodiments, the second signaling information may comprise an indication to indicate the terminal device to stop an active timer of the DRX to enter into the sleep mode. Alternatively, the second signaling information may comprise an indication to perform the DRX based on the configuration in the first signaling information. In other embodiments, the second signaling information may comprise an indication to perform the long DRX. The second signaling information may comprise explicit information to indicate the terminal device 110-1 how to perform the DRX upon receiving the second signaling information. Alternatively, the second signaling information may only indicate to enter the sleep mode.

In some embodiments, the second signaling information may also comprise an indication to switch the terminal device 110-1 to the first BWP for the primary cell connected with the terminal device 110-1. In some embodiments, the second signaling information may also comprise an indication to switch the terminal device 110-1 to the dormant BWP for the secondary cell connected with the terminal device 110-1. In other embodiments, the second signaling information may also comprise an indication to stop decoding a physical downlink shared channel (PDSCH) during the sleep mode.

At block 530, the network device 120 transmits the second signaling information to the terminal device 110-1 on the second protocol layer. The second protocol layer may be lower than the first protocol layer. For example, the second protocol layer may be the physical layer and the first protocol layer may be the MAC layer. In some embodiments, the second signaling information may be transmitted in the downlink control information (DCI).

In some embodiments, an apparatus for performing the method 400 (for example, the terminal device 110-1) may comprise respective means for performing the corresponding steps in the method 400. These means may be implemented in any suitable manners. For example, it can be implemented by circuitry or software modules.

In some embodiments, the apparatus comprises means for receiving first signaling information on a first protocol layer, the first signaling information concerning monitoring a physical downlink channel; means for receiving, from the second device and on a second protocol layer lower than the first protocol layer, second signaling information indicating the first device to enter into a sleep mode; and means for monitoring the physical downlink channel based on the first signaling information and the second signaling information.

In some embodiments, the apparatus comprises: means for in response to receiving the second signaling information, stopping an active timer of the DRX to enter the sleep mode.

In some embodiments, the apparatus comprises: means for in response to receiving the second signaling information performing the DRX based on the configuration of the DRX.

In some embodiments, the apparatus comprises means for switching, based on the signaling second signaling information, the first device to a first bandwidth part, BWP, for a primary cell.

In some embodiments, the apparatus comprises means for switching, based on the second signaling information, the first device to a dormant bandwidth part, BWP, for a secondary cell.

In some embodiments, the apparatus comprises means for switching based on the second signaling information, the first device to a first bandwidth based, BWP for a cell.

In some embodiments, if the cell is a primary cell, the first BWP is one of the followings for the primary cell: an initial BWP, a default BWP and a first Active BWP.

In some embodiments, if the cell is a secondary cell, the first BWP is one of the followings for the secondary cell: an initial BWP, a default BWP, a first Active BWP and a dormant BWP.

In some embodiments, the apparatus comprises means for in response to the cell being a secondary cell and the first BWP being a dormant BWP, stop PDCCH monitoring for the dormant BWP.

In some embodiments, the first signaling information comprising configuration of a first bandwidth part and a second bandwidth part on a serving cell with respective downlink control channel monitoring configurations.

In some embodiments, the apparatus comprises means for in response to receiving the second signaling information, stopping decoding a physical downlink shared channel (PDSCH) during the sleep mode.

In some embodiments, the apparatus comprises means for informing, to the first protocol layer, a receipt of the second signaling information on the second protocol layer.

In some embodiments, the second signaling information comprises a duration in which the first device is allowed to sleep.

In some embodiments, an apparatus for performing the method 500 (for example, the network device 120) may comprise respective means for performing the corresponding steps in the method 500. These means may be implemented in any suitable manners. For example, it can be implemented by circuitry or software modules.

In some embodiments, the apparatus comprises means for transmitting, to a first device and on a first protocol layer, first signaling information concerning monitoring a physical downlink channel; means for generating, at the second device, second signaling information indicating the first device to enter into a sleep mode; and means for transmitting, to the first device, the second signaling information on a second protocol layer lower than the first protocol layer.

In some embodiments, the means for generating the second signaling information comprises: means for generating the second signaling information to indicate stopping an active timer of discontinuous reception, DRX, at the first device.

In some embodiments, the means for generating the second signaling information comprises: means for generating the second signaling information to indicate performing discontinuous reception, DRX, based on the first signaling information.

In some embodiments, the means for generating the second signaling information comprises means for generating the second signaling information to indicate switching the first device to a first bandwidth part, BWP, for a primary cell.

In some embodiments, the means for generating the second signaling information to indicate switching the first device to a dormant bandwidth part. BWP, for a secondary cell.

In some embodiments, the means for generating the second signaling information comprises means for generating an indication to stop decoding a physical downlink shared channel (PDSCH) during the sleep mode.

In some embodiments, the second signaling information comprises a duration in which the first device is allowed to sleep.

In some embodiments, the first device is a terminal device and the second device is a network device.

Figure 6:
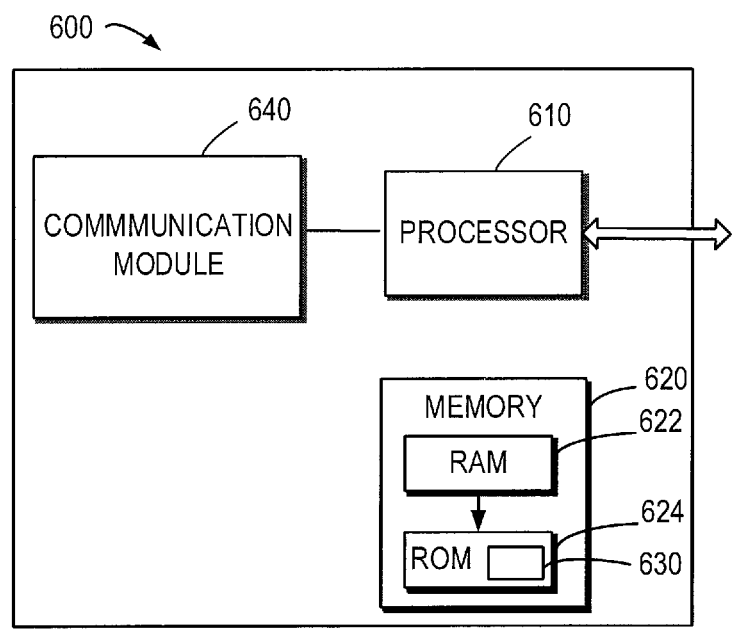
FIG. 6 illustrates a schematic diagram of a device according to embodiments of the present disclosure.

FIG. 6 is a simplified block diagram of a device 600 that is suitable for implementing embodiments of the present disclosure. The device 600 may be provided to implement the communication device, for example the network device 120 or the terminal devices 110 as shown in FIG. 1. As shown, the device 600 includes one or more processors 610, one or more memories 620 coupled to the processor 610, and one or more communication module (for example, transmitters and/or receivers (TX/RX)) 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

In some embodiments, the program 630 may be tangibly contained in a computer readable medium which may be included in the device 600 (such as in the memory 620) or other storage devices that are accessible by the device 600.

Figure 7:
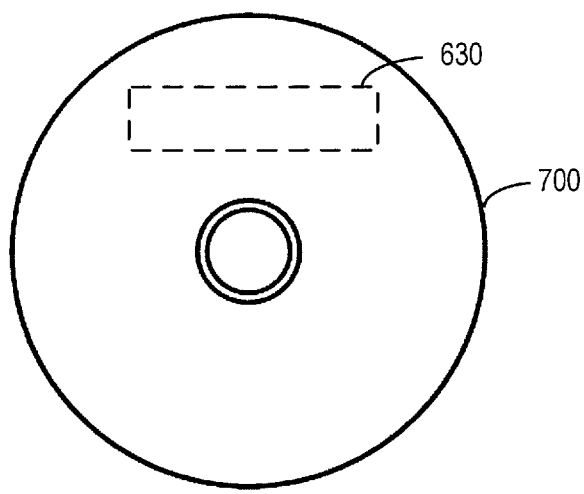
FIG. 7 shows a block diagram of an example computer readable medium in accordance with some embodiments of the present disclosure.

The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory storing instructions, that when executed by the at least one processor, cause the first device to:
   receive first signaling information on a first protocol layer, the first signaling information concerning monitoring a physical downlink channel;
   receive, from a second device and on a second protocol layer lower than the first protocol layer, second signaling information indicating the first device to enter into a sleep mode; and
   monitor the physical downlink channel based on the first signaling information and the second signaling information; and
   switch, based on the second signaling information, the first device to a first bandwidth part for a cell, wherein the cell is a secondary cell,
   wherein the first bandwidth part is a dormant bandwidth part, and
   wherein the first device shall stop physical downlink control channel monitoring for the secondary cell.

2. The first device of claim 1, wherein the first signaling information comprises configuration for discontinuous reception, discontinuous reception at the first device, and the at least one non-transitory memory is storing instructions, that when executed by the at least one processor cause the first device to:
   in response to receiving the second signaling information, stop an active timer of the discontinuous reception to enter the sleep mode.

3. The first device of claim 1, wherein the first signaling information comprises configuration for discontinuous reception, discontinuous reception at the first device, and the first device is caused to: in response to receiving the second signaling information, perform the discontinuous reception based on the configuration of the discontinuous reception.

4. The first device of claim 1, wherein the first signaling information comprises configuration of a first bandwidth part and a second bandwidth part on a serving cell with respective downlink control channel monitoring configurations.

5. The first device of claim 1, wherein the at least one non-transitory memory is storing instructions, that when executed by the at least one processor cause the first device to:
   switch, based on the second signaling information, the first device to a first bandwidth bandwidth part for a cell.

6. The first device of claim 5, wherein if the cell is a primary cell, the first bandwidth part is one of the followings for the primary cell: an initial bandwidth part, a default bandwidth part and a first Active bandwidth part.

7. The first device of claim 5, wherein the at least one non-transitory memory is storing instructions, that when executed by the at least one processor cause the first device to:
   in response to the cell being the secondary cell and the first bandwidth part being a dormant bandwidth, stop physical downlink control channel monitoring for the dormant bandwidth part.

8. The first device of claim 1, wherein the at least one non-transitory memory is storing instructions, that when executed by the at least one processor cause the first device to:
   in response to receiving the second signaling information, stop decoding a physical downlink shared channel during the sleep mode.

9. The first device of claim 1, wherein the at least one non-transitory memory is storing instructions, that when executed by the at least one processor cause the first device to:
   inform, to the first protocol layer, a reception of the second signaling information on the second protocol layer.

10. The first device of claim 9, wherein the at least one memory is storing instructions, that when executed by the at least one processor cause the first device to:
    determine to stay outside of active time or to transit from outside of active time to active time, based on the reception of the second signaling information.

11. The first device of claim 1, wherein the second signaling information comprises a duration in which the first device is allowed to sleep.

12. The first device of claim 1, wherein the first device comprises a terminal device and the second device comprises a network device.

13. The first device of claim 1, wherein the physical downlink channel comprises one of: a physical downlink control channel, or a physical downlink shared channel for semi-persistent scheduling.

14. A second device comprising:
    at least one processor; and
    at least one memory storing instructions, that when executed by the at least one processor, cause the second device to:
    transmit, to a first device and on a first protocol layer, first signaling information concerning monitoring a physical downlink channel;
    generate, at a second device, second signaling information indicating the first device to enter into a sleep mode; and transmit, to the first device, the second signaling information on a second protocol layer lower than the first protocol layer, wherein the second signaling information indicates the first device to switch to a first bandwidth part for a cell, wherein the cell is a secondary cell, wherein the first bandwidth part is a dormant bandwidth part, and wherein the first device shall stop physical downlink control channel monitoring for the secondary cell.

15. The second device of claim 14, wherein the second signaling information is generated by generating the second signaling information to indicate stopping an active timer of discontinuous reception at the first device.

16. The second device of claim 14, wherein the second signaling information is generated by: generating the second signaling information to indicate performing discontinuous reception based on the first signaling information.

17. The second device of claim 14, wherein the second signaling information is generated by: generating the second signaling information to indicate switching the first device to a first bandwidth part for a primary cell.

18. The second device of claim 14, wherein the second signaling information is generated by: generating the second signaling information to indicate switching the first device to a dormant bandwidth part for the secondary cell.

19. The second device of claim 14, wherein the second signaling information is generated by: generating the second signaling information to indicate stopping decoding a physical downlink shared channel during the sleep mode.

* * * * *